US008826698B2

(12) United States Patent
Millicevic et al.

(10) Patent No.: US 8,826,698 B2
(45) Date of Patent: Sep. 9, 2014

(54) METHOD FOR MANUFACTURING A PRIMARY PREFORM FOR OPTICAL FIBRES, PRIMARY PREFORM, FINAL PREFORM AND OPTICAL FIBRE

(71) Applicant: Draka Comteq B.V., Amsterdam (NL)

(72) Inventors: Igor Millicevic, Helmond (NL); Mattheus Jacobus Nicolaas Van Stralen, Tilburg (NL); Eugen Aldea, Eindhoven (NL); Gerardus Franciscus Cleven, Valkenswaard (NL)

(73) Assignee: Draka Comteq B.V., Amsterdam (NL)

( * ) Notice: Subject to any disclaimer, the term of this patent is extended or adjusted under 35 U.S.C. 154(b) by 83 days.

(21) Appl. No.: 13/623,226

(22) Filed: Sep. 20, 2012

(65) Prior Publication Data

US 2013/0067961 A1 Mar. 21, 2013

(30) Foreign Application Priority Data

Sep. 20, 2011 (NL) ...................................... 2007448

(51) Int. Cl.
*C03B 37/018* (2006.01)
*C03B 37/027* (2006.01)

(52) U.S. Cl.
CPC ........... *C03B 37/018* (2013.01); *C03B 37/0183* (2013.01)
USPC .............................. 65/391; 417/419; 417/436

(58) Field of Classification Search
CPC .......................... C03B 37/018; C03B 37/0183
See application file for complete search history.

(56) References Cited

U.S. PATENT DOCUMENTS

| 4,549,781 A | * | 10/1985 | Bhagavatula et al. ........ 385/126 |
| 4,741,747 A | | 5/1988 | Geittner et al. |
| 5,145,509 A | | 9/1992 | Bachmann et al. |
| 5,188,648 A | | 2/1993 | Geittner et al. |
| 6,542,683 B1 | * | 4/2003 | Evans et al. .................... 385/127 |
| 2003/0115908 A1 | * | 6/2003 | Hammerle et al. ............. 65/379 |
| 2005/0172902 A1 | * | 8/2005 | Van Stralen et al. ... 118/723 MW |
| 2008/0031582 A1 | * | 2/2008 | Gonnet et al. ................. 385/127 |
| 2008/0044150 A1 | | 2/2008 | Terpsma et al. |
| 2009/0003787 A1 | * | 1/2009 | Hartsuiker et al. ........... 385/124 |

FOREIGN PATENT DOCUMENTS

| JP | 57 051139 A | 3/1982 |
| WO | 2004 101458 A1 | 11/2004 |

OTHER PUBLICATIONS

Search Report for Netherlands Application No. 236668 dated Sep. 20, 2011.

* cited by examiner

*Primary Examiner* — Matthew Daniels
*Assistant Examiner* — Lisa Herring
(74) *Attorney, Agent, or Firm* — Shumaker, Loop & Kendrick, LLP

(57) ABSTRACT

A method for manufacturing a primary preform for an optical fiber wherein conditions are created in the reaction zone such that one or more glass layer packages made up of at least two separate glass layers are deposited on the interior of the substrate tube. A method for manufacturing a final preform as well as primary preforms, final preforms and optical fibers obtained therewith.

17 Claims, 10 Drawing Sheets

METHOD FOR MANUFACTURING A PRIMARY PREFORM FOR OPTICAL FIBRES, PRIMARY PREFORM, FINAL PREFORM AND OPTICAL FIBRE

CROSS-REFERENCE TO RELATED APPLICATION

This application claims priority to Dutch Patent Application No. NL 2007448 filed Sep. 20, 2011, the entirety of which is incorporated by reference herein.

TECHNICAL FIELD AND BACKGROUND OF THE INVENTION

The present invention relates to a method for manufacturing a primary preform for an optical fibre, using a plasma chemical internal vapour deposition process, wherein doped or undoped glass-forming precursors are supplied to the interior of a hollow glass substrate tube, a reaction zone in the form of a plasma is moved back and forth along the length of the aforesaid hollow glass substrate tube between a point of reversal near the supply side and a point of reversal near the discharge side of the hollow substrate tube, wherein the substrate tube is positioned in a furnace and wherein such conditions are created in the aforesaid reaction zone that one or more glass layer packages made up of at least two separate glass layers are deposited on the interior of the aforesaid substrate tube. The present invention further relates to a method for manufacturing a final preform, to optical fibres as well as to primary preforms, final preforms and optical fibres obtained therewith.

In internal vapour deposition techniques, a reaction mixture consisting of glass-forming gases and optional dopants is supplied at the supply side of a hollow glass substrate tube, after which said gases are converted into glass in a reaction zone. Unreacted gases and/or residual products are discharged via the discharge side of the hollow glass substrate tube.

In an internal vapour deposition process of the PCVD (Plasma Chemical Vapour Deposition) type, the reaction zone is a plasma which is moved back and forth along the length of the hollow glass substrate tube. In a PCVD process, glass layers are directly deposited on the interior of the hollow glass substrate tube, independently of the direction in which the reaction zone is moving. A PCVD process is known, inter alia from U.S. Pat. Nos. 4,741,747, 5,145,509, 5,188,648, WO 2004/101458 and US 2008/0044150.

In an internal vapour deposition process of the MCVD (Modified Chemical Vapour Deposition) or FCVD (Furnace Chemical Vapour Deposition) type, the reaction of the glass-forming gases and optional dopants is activated by heating the exterior of the hollow glass substrate tube, using a burner or a furnace, respectively. In the reaction zone, which is located near the burner or the furnace, the glass-forming gases are converted into so-called soot, which soot is deposited on the interior of the hollow glass substrate tube under the influence of thermophoresis. Said soot is converted into glass by means of heating. In an MCVD or an FCVD process, glass layers are deposited only when the reaction zone is moving in the direction of the discharge side of the hollow glass substrate tube. PCVD, MCVD and FCVD process are known in the art.

JP 57-51139 discloses an MCVD process in which a starting material for an optical fibre is produced. In a cycle, a number of glass layers are deposited on the interior of a substrate tube, with the deposition starting at a position near the supply side and the distance along which the reaction zone moves in the direction of the discharge side varying with each glass layer. The starting material is produced by carrying out a number of cycles in succession.

An optical fibre consists of a core and an outer layer surrounding said core, also referred to as "cladding". The core usually has a higher refractive index than the cladding, so that light can be transported through the optical fibre.

The core of an optical fibre may consist of one or more concentric layers, each having a specific thickness and a specific refractive index or a specific refractive index gradient in radial direction.

An optical fibre having a core consisting of one or more concentric layers having a constant refractive index in radial direction is also referred to as a (multiple) step-index optical fibre. The difference $n_i$ between the refractive index of a concentric layer and the refractive index $n_{cl}$ of the cladding can be expressed in a so-called delta value, indicated $\Delta_i\%$ and can be calculated according to the formula below:

$$\Delta_i\% = \frac{n_i^2 - n_{cl}^2}{2n_i^2} * 100\%$$

where:
$n_i$=refractive index value of layer i
$n_{cl}$=refractive index value of the cladding An optical fibre can also be manufactured in such a manner that a core having a so-called gradient index refractive index profile is obtained. Such a radial refractive index profile is defined both with a delta value $\Delta A\%$ and with a so-called alpha value $\alpha$. The maximum refractive index in the core is used for determining the $\Delta\%$ value. The alpha value can be determined by means of the formula below:

$$n(r) = n_1 \left(1 - 2\Delta\% \left(\frac{r}{a}\right)^\alpha\right)^{\frac{1}{2}}$$

where:
$n_1$=refractive index value in the centre of het fibre
a=radius of the gradient index core [μm]
$\alpha$=alpha value
r=radial position in the fibre [μm]

A radial refractive index profile of an optical fibre is to be regarded as a representation of the refractive index as a function of the radial position in an optical fibre. Likewise it is possible to graphically represent the refractive index difference with the cladding as a function of the radial position in the optical fibre, which can also be regarded as a radial refractive index profile.

The form of the radial refractive index profile, and in particular the thicknesses of the concentric layers and the refractive index or the refractive index gradient in the radial direction of the core determine the optical properties of the optical fibre.

A primary preform comprises one or more preform layers which form the basis for the one or more concentric layers of the core and/or part of the cladding of the optical fibre that can be obtained from a final preform.

A preform layer is built up of a number of glass layers. In an internal vapour deposition process, a glass layer is the layer that is deposited upon movement of the reaction zone from the supply side to the discharge side or from the discharge side to the supply side.

A final preform as referred to herein is a preform from which an optical fibre is made, using a fibre drawing process.

To obtain a final preform, a primary preform is externally provided with an additional layer of glass, which additional layer of glass comprises the cladding or part of the cladding. Said additional layer of glass can be directly applied to the primary preform. It is also possible to place the primary preform in an already formed glass tube, also referred to as "jacket tube". Said jacket may be contracted onto the primary preform. Finally, a primary preform may comprise both the core and the cladding of an optical fibre, so that there is no need to apply an additional layer of glass. A primary preform is in that case identical to a final preform. A radial refractive index profile can be measured on a primary preform and/or on a final preform.

The length and the diameter of a final preform determine the maximum length of optical fibre that can be obtained from the final preform.

To decrease the production costs of optical fibres and/or increase the yield per primary preform, the aim is therefore to produce a maximum length of optical fibre that meets the required quality standards, and that on the basis of a final preform.

The diameter of a final preform can be increased by applying a thicker layer of additional glass to a primary preform. Since the optical properties of an optical fibre are determined by the radial refractive index profile, the layer of additional glass must at all times be in the correct proportion to the layer thickness of the preform layers of the primary preform that will form the core, more in particular the one or more concentric layers of the core, in the optical fibre. Consequently, the layer thickness of the glass layer additionally applied to the primary preform is limited by the thickness of the preform layers being formed by means of the internal vapour deposition process.

The length of a final preform can be increased by increasing the length, more in particular the usable length, of a primary preform. The term "usable length" is to be understood to be the length of the primary preform along which the optical properties remain within predetermined tolerance limits, which tolerance limits have been selected so that optical fibres that meet the desired quality standards are obtained.

To determine the usable length of the primary preform, a radial refractive index profile is measured at a number of positions along the length thereof, after which it is possible, based on said measurements, to determine a so-called longitudinal refractive index profile and a longitudinal geometry profile for each preform layer, if desired.

Thus, a longitudinal refractive index profile can be considered to be a graphic representation of the refractive index of a preform layer as a function of the longitudinal position in the primary preform. It is also possible, of course, to use the refractive index difference rather than the refractive index for determining a longitudinal refractive index profile.

A longitudinal geometry profile can be considered to be a graphic representation of the thickness of the cross-sectional area of a preform layer as a function of the longitudinal position in the primary preform. The cross-sectional area, also referred to as CSA, can be calculated on the basis of a radial refractive index profile. The CSA can be calculated as follows:

$$CSA_i = \frac{\pi}{4}(d_{i,u}^2 - d_{i,i}^2)$$

where
$CSA_i$=cross-sectional area of the preform layer i [mm²]
$d_{i,u}$=external diameter of the preform layer i [mm]
$d_{i,i}$=internal diameter of the preform layer i [mm]

The usable length of a primary preform is in particular adversely affected by so-called "taper". The term "taper" is to be understood to be a deviation of the optical and/or geometric properties of the primary preform in regions near the ends thereof. A distinction is made between optical taper and geometric taper.

Optical taper relates to deviations of the refractive index (or the refractive index difference), whilst geometric taper relates to deviations of the cross-sectional area of the preform layer.

If a primary preform is built up of several preform layers, the optical and geometric taper of the preform layers differ from each other.

Methods for reducing optical and/or geometric taper are known in the art.

U.S. Pat. No. 4,741,747, for example, discloses a method for manufacturing optical preforms according to the PCVD method, wherein glass layers are deposited by causing a plasma to move back and forth between two points of reversal in the interior of a glass tube, with the addition to the tube of a reactive gas mixture at a temperature ranging between 1100° C. and 1300° C. and a pressure ranging between 1 hPa and 30 hPa. By causing the plasma to move non-linearly as a function of time near at least one of the points of reversal, the magnitude of the region exhibiting non-constant deposition geometry at the ends of the optical preform is reduced.

The present inventors have found that such a method leads to a reduction of the geometric taper, to be true, but that the optical taper does not improve, or even worsens. Moreover, the present inventors have found that it is in some cases necessary to influence the refractive index of the deposited glass also at other positions outside the so-called taper regions.

Although it is thus possible, using the prior art methods, to increase the usable length of a primary preform, there is a need for a method by means of which the usable length can be increased even further.

BRIEF SUMMARY OF THE INVENTION

Accordingly it is an object of the present invention to provide a method for manufacturing primary preforms for optical fibres that have a large usable length.

Another object of the present invention is to provide a method for manufacturing primary preforms for optical fibres in which the influencing of optical taper can take place independently of geometric taper.

Yet another object of the present invention is to provide a method by which the refractive index and/or the cross-sectional area can be accurately set as desired as a function of the position in the longitudinal direction of the primary preform.

The present invention comprises the following steps:
i) defining deposition conditions for the deposition of a number of glass layers to be deposited adjacent to each other and forming a glass layer package under the aforesaid deposition conditions,
ii) defining deposition conditions for the deposition of a successive number of glass layers to be deposited adjacent to each other and forming a subsequent glass layer package under the aforesaid deposition conditions, wherein the deposition conditions thus defined for i) and ii) differ from each other, and iii) possibly repeating steps i) and ii),
    wherein the deposition conditions defined under iii) may be identical to the process conditions defined under i) and ii). Based on the above method, one or more of the objects of the present application are thus achieved.

The present inventors have found that the axial distribution of the refractive index and the layer thickness of the glass layers to be deposited by means of the plasma chemical internal vapour deposition process are dependent on a number of process factors, in which regard the extent of the deposition, the temperature profile of the furnace positioned around the substrate tube, the velocity profile of the movable reaction zone and the supplied amount of oxygen, among other factors, can be mentioned. Based on the aforesaid process parameters it is possible to set a very uniform distribution both of the refractive index profile and of the layer thickness along the length of the substrate tube. The present inventors thus aim at setting the present method so that the aim is to obtain a maximum result both as regards the uniformity of the refractive index and as regards the layer thickness.

The present invention is thus based on the assumption that in order to obtain a more uniform profile as regards the refractive index and/or the layer thickness along the length of the substrate tube, use is made of a combination of glass layer packages which, considered individually, do not have the desired properties in terms of refractive index or layer thickness, but which do have the intended properties in combination with each other. The present inventors have thus achieved the present invention by forming glass layer packages, using the plasma chemical internal vapour deposition process, in which a combination of layers is used by which a result is obtained which is more constant as a function of position both for the refractive index and for the cross-sectional area of the glass layer package.

The term "glass layer package" as used in the present application is to be considered to be an assembly of glass layers located adjacent to each other. In particular it applies that the deposition conditions within such a glass layer package consisting of a number of glass layers located adjacent to each other are identical to each other. Thus, the deposition conditions of the glass layer package obtained in step i) are the same for each glass layer present in the glass layer package. According to step ii) of the present method, a subsequent glass layer package is obtained, using a plasma chemical internal vapour deposition process, in which the deposition conditions used for said successive glass layer package are different from the deposition conditions for the glass layer package obtained according to step i). The aforesaid steps i) and ii) may be repeated, according to what is needed, thus obtaining glass layer packages a, b, c, d, etc, with the deposition conditions for the glass layer packages a, b, c, d differing from each other. Thus it is possible to obtain several glass layer packages, using a plasma chemical internal vapour deposition process, wherein any random order of deposition conditions may be used, with this proviso, that the deposition conditions for glass layer packages located adjacent to each other must be different from each other. Glass package combinations of, for example, a, b, c, b, a, are possible therefore, but also combinations of a, b, c, d, a, b, c, etc. The present invention is not limited to the number of glass layer packages and may therefore comprise two, three, four or even more glass layer packages, depending on the special profile conditions of the optical glass fibre. It is important in this regard that the same deposition conditions are used within a glass layer package, and that the deposition conditions for a subsequent glass layer package are different from those used for the adjacent glass layer package previously obtained by deposition. It is thus desirable that the deposition conditions of glass layers located adjacent to each other within one and the same glass layer package correspond to each other. More in particular, it is desirable that within a particular glass layer package, the refractive index value of one glass layer obtained by deposition corresponds to the refractive index value of another glass layer obtained by deposition. The number of glass layers within a glass layer package must not be construed as being limitative. In addition to that, the number of glass layers in one glass layer package may be essentially different from the number of glass layers in another glass layer package.

A glass layer is formed during the movement of the reaction zone. This means that a single glass layer will be formed upon movement of the reaction zone from, for example, supply side to discharge side. If similar process conditions still apply, a glass layer will also be formed upon movement of the reaction zone from the discharge side to the supply side. The combination of glass layers thus deposited on the interior of a glass substrate tube forms a glass layer package. If one or more of the process conditions is changed, resulting in a refractive index which is different from the foregoing glass layer package for example by increasing the amount of dopant in the reaction mixture, the deposition of a "new" glass layer package will start. And such a "new" glass layer package may comprise several glass layers, i.e. its number may be different from the number of glass layers present in the previous glass layer package(s). And the refractive index value of each glass layer package may differ from the refractive index value of other glass layer package(s). The present invention is based on the idea that the average refractive index value of glass layer packages made up of a combination of a number of individual glass layer packages arranged adjacent to each other, wherein the combination of glass layer packages forms a so-called preform layer, is essential and that the individual refractive index values of each glass layer package may be different from the "combined" value. The "combined" value is the key factor. And it will be clear that a primary preform may consist of several preform layers.

In the aforementioned description, reference to the refractive index value has been made, but the present method is also applicable for the technical feature of the cross-sectional area (CSA), as will be explained hereafter in detail.

The present inventors have further found that the average refractive index value of glass layer packages made up of a combination of a number of individual glass layer packages arranged adjacent to each other is to be considered to be combination of the refractive index values of each individual glass layer package, wherein the refractive index values of at least two such individual glass layer packages in the aforesaid combined glass layer package differ from each other.

It furthermore applies that the cross-sectional area (CSA) of glass layer packages made up of a combination of a number of individual glass layer packages arranged adjacent to each other is to be considered to be a combination of the CSA values of each individual glass layer package, wherein the CSA values of at least two such individual glass layer packages in the aforesaid combined glass layer package differ from each other.

The present invention is not limited to a particular number of glass layer packages, however, nor to the number of glass layers in a particular glass layer package.

The present invention is based on the perception that when a final preform is drawn, the layer thicknesses of the glass layers deposited by using an internal vapour deposition process are drastically reduced in the final preform. A typical optical fibre has a diameter of 125 μm. A final preform for single mode fibres has a diameter of about 100 to 150 mm, for example, or even more. The thickness of the preform layers, and thus also the thickness of the glass layers in the final preform, are therefore reduced by a factor in the order of about 800 to 1200, or even more, during the manufacture of the optical fibre.

The present inventors have realised that the way in which the light propagates through the optical fibre is influenced by the average properties of a number of adjacent glass layers rather than by the properties of each individual glass layer. The present inventors have thus found that it is possible to build up a preform layer from glass layer packages, wherein each glass layer package consists of at least two glass layers and wherein the optical properties of the glass layer packages differ from each other, but that the combination of glass layer packages does not have an effect on the propagation of the light through the optical fibre.

Using the present invention, it is therefore possible to set the deposition conditions of the glass layers such that geometric taper is minimised whilst the optical taper is hardly influenced, if at all. Using the present invention, it is furthermore possible to set the deposition conditions of the glass layers such that optical taper is minimised while the geometric taper is hardly, if at all, influenced thereby. Put differently, using the present invention it has been found to be possible to set the optical taper and the geometric taper independently of each other. Consequently, the usable length of a primary preform can be increased in comparison with prior art methods.

The present invention further provides a possibility of manufacturing a primary preform wherein the ratio of the cross-sectional areas of the various preform layers is substantially constant along the length of the primary preform, but wherein the layer thicknesses of the preform layers are not constant along the length of the primary preform. Such a primary preform may be provided with an additional glass layer in a further processing step, with the layer thickness of the additional glass layer being selected so that the ratio between the cross-sectional area of the additional glass layer and the cross-sectional area of the preform layer will be constant along the length of the primary preform. In this way a final primary preform is obtained in which the ratio between the additional layer and the preform layers is constant along the length of the final preform. The external diameter of such a final preform is usually not constant in the longitudinal direction. The aforesaid technology is also referred to as "profile overcladding". After being drawn into a fibre having a constant external diameter, a final preform produced on the basis of profile overcladding technology will result in a fibre in which the layer thicknesses of the concentric layers of the core and the cladding are substantially constant, seen in the longitudinal direction, which in turn will result in a fibre exhibiting substantially constant optical properties, seen in the longitudinal direction.

In a preferred embodiment, the glass layers of a glass layer package each have a thickness, seen in radial direction, which ranges from 0.1 µm to 10 µm, preferably from 0.5 µm to 5 µm.

In another preferred embodiment, the number of glass layers of which a glass layer package is made up ranges from 2-100, preferably from 2-50 and more preferably from 4-30. A relatively high number of glass layers makes it possible to realise a precise control of the average optical properties of the glass layer package. A small number of glass layers is relatively easy to control, but imposes limits as regards the possibilities of setting the average optical properties of the glass layer package. A process that is readily controllable in practice can be carried out by using a glass layer package comprising about 10-20 glass layers.

The number of glass layers of a glass layer package is preferably set so that the following condition is met:

$$N \le 0,1 * \frac{\lambda * Q_{final}}{d * Q_{fibre}}$$

where:
N=the number of glass layers in a glass layer package [-]
λ=the minimum wavelength used of the optical fibre [µm]
d=the thickness of a glass layer in a glass layer package of a primary preform [µm]
$Q_{final}$=the diameter of the final preform produced on the basis of the primary preform [mm]
$Q_{fibre}$=the diameter of the optical fibre [mm].

Defining the deposition conditions preferably comprises the setting of one or more process parameters selected from the group of: flow of the glass-forming precursors to be metered at the supply side, percentage of dopant(s), velocity of the reaction zone, intensity of the plasma of the reaction zone and length of the reaction zone.

It is noted that the direction of movement of the reaction zone must not be regarded as a deposition condition.

In the present invention it is desirable that the respective deposition condition be kept constant along the deposition length, viz. the length of the substrate tube along which the reaction zone is moved between the two points of reversal, during the deposition of glass layers for forming a glass layer package. In a special embodiment it thus applies that the deposition condition determined for the deposition of one glass layer package made up of a number of glass layers is constant during the deposition of said one glass layer package, and that the deposition condition determined for the deposition of the other glass layer package made up of a number of glass layers is also constant during the deposition of said other glass layer package, but that the deposition condition used for said one glass layer package is different from the deposition condition used for said other glass layer package.

The dopants may be agents that increase or decrease the refractive index. The present invention is not limited to the use of a single dopant, it is also possible to use a combination of dopants. The dopants used may furthermore vary with each glass layer of glass layer package. Suitable dopants are, for example, $GeCl_4$, $PO_2Cl_5$, $N_2CF_4$, $SiF_4$, $C_2F_6$, $C_4F_8$, $CCl_2F_2$, $SiF_4$, $Si_2F_6$, $SF_6$, $NF_3$ en $F_2$.

By setting the amount of dopant along the length of the primary preform it is possible to obtain a desired longitudinal refractive index profile. If necessary, the velocity of the reaction zone can also be set as a function of the position so as to influence the thickness of the glass layer in longitudinal direction. Thus it is also possible to influence the geometric paper.

The gases, such as $O_2$, Ar and He, can have an effect on the intensity of the plasma when supplied to the reaction zone, the result being that the incorporation efficiency of dopants can be increased or decreased, as the case may be. Furthermore, the total amount of deposited glass, and thus the layer thickness of a glass layer, can be influenced to some extent.

The deposition length is to be considered to be the distance between a point of reversal of the reaction zone near the supply side and a point of reversal of the reaction zone near the discharge side of the hollow glass substrate tube. Setting the deposition length can thus be done by setting the position of the points of reversal of the reaction zone for the glass layers of a glass layer package. Varying the deposition length is one possibility for influencing the layer thickness of the glass layer package near the supply side and/or the discharge side. Preferably, the deposition length is reduced by no more than the length of the plasma at the supply side. Furthermore preferably, the deposition length is reduced by no more than the length of the plasma at the discharge side. The length of the plasma in a PCVD process is about 5 cm-60 cm, preferably 15 cm-25 cm. It is noted that setting the deposition length must not be construed as defining the deposition conditions.

The reaction zone is preferably a plasma generated by means of microwaves, it preferably moves back and forth in the longitudinal direction of the hollow glass substrate tube, between the two points of reversal, at an average velocity ranging between 2 m/min-40 m/min, preferably 15 m/min-25 m/min.

The primary preform preferably comprises at least one preform layer, which preform layer is at least in part built up of glass layer packages, wherein the preform layer has a substantially constant average refractive index, seen in radial direction. The principle of the present invention applies both to preform layers having a constant (average) refractive index, referred to as "step index" preform layers, and to preform layers having a non-constant refractive index. For example, the present invention can also be used in the manufacture of preforms for optical fibres having a core of the gradient index type, or a core having a triangular refractive index profile.

If a primary preform comprises several different preform layers, the glass layer packages of which said different preform layers are built up may differ from each other. A first preform layer may for example be built up of glass layer packages comprising ten glass layers, whilst a second preform layer is built up of glass layer packages comprising sixteen glass layers. The deposition conditions for the various glass layer packages may also differ from each other, but the same deposition conditions are used for each of the glass layers within such a glass layer package.

The present invention further relates to a method for manufacturing a final preform for an optical fibre, comprising the following steps:
 i) manufacturing a primary preform according to the present invention;
 ii) contracting the primary preform obtained in step i) in to a solid primary preform under the influence of a heat source; and
 iii) optionally applying an additional amount of glass to the outer side of the solid primary preform obtained in step ii) so as to form the final preform.

Subsequently an optical fibre can be produced by heating one end of the final preform and drawing the optical fibre therefrom.

BRIEF DESCRIPTION OF THE DRAWINGS

The present invention will now be explained in more detail by means of example with reference to a number of figures, in which regard it should be noted, that the present invention is by no means limited thereto.

DETAILED DESCRIPTION OF THE INVENTION

Figure 1:
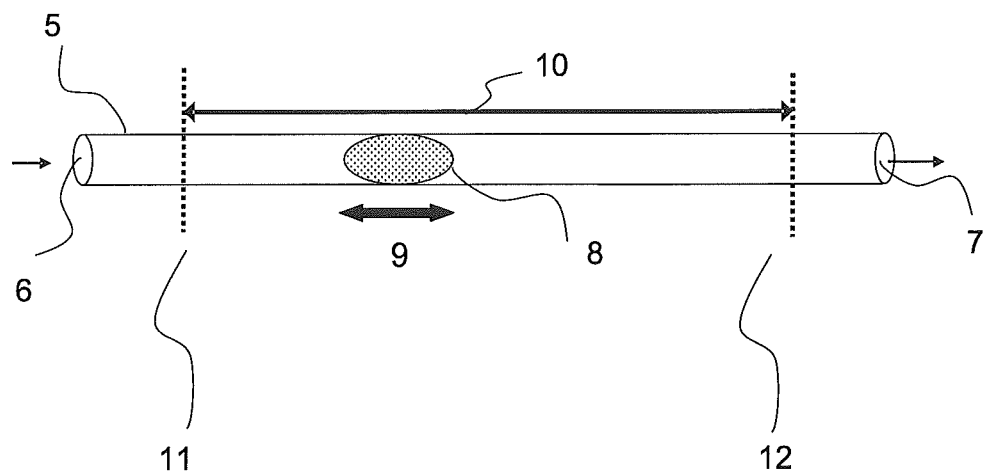
FIG. 1 schematically shows a plasma chemical internal vapour deposition process.

FIG. 1 schematically shows an internal vapour deposition process for manufacturing a primary preform for optical fibres. A hollow glass substrate tube 5 has a supply side 6 and the discharge side 7. The supply side 6 and the discharge side 7 can be positioned between a gas inlet and a gas outlet, respectively (not shown). The supply side 6 and the discharge side 7 can be clamped down, for example by means of a cylindrical passage provided with an O-ring seal, so that the internal volume of the hollow glass substrate tube 5 is isolated from the outside atmosphere. Such a construction makes it possible to carry out an internal vapour deposition process at a reduced pressure when a pump (not shown) is connected to the gas outlet. The reaction mixture containing the glass-forming gases and optional dopants is supplied at the supply side 6 during the vapour deposition process. Any additional dopants that are supplied in the method according to the present invention may either be supplied directly at the supply side 6 or be mixed with the reaction mixture prior to being supplied.

In FIG. 1 there is furthermore shown a reaction zone 8, which reaction zone 8 moves back and forth during the internal vapour deposition process between a point of reversal 11 located near the supply side 6 and a point of reversal 12 located near the discharge side 7. The reaction zone 8 has a length 9, seen in the longitudinal direction of the substrate tube 5, which is relatively small in relation to the deposition length. For a PCVD process, the length 9 is about 5 cm-60 cm.

The distance between the two points of reversal is the deposition length 10, which deposition length 10 corresponds to the length along which glass layers are deposited on the interior of the hollow glass substrate tube 5. In a PCVD type internal vapour deposition process, at least the deposition length 10 and the two points of reversal may be surrounded by a furnace (not shown), which is set at a temperature of about 800° C.-1300° C., preferably 950° C.-1100° C.

During the internal vapour deposition process, a gas mixture of doped or undoped glass-forming gases is supplied via the supply side 6 of the hollow glass substrate tube 5, which glass-forming gases are converted into glass in the reaction zone 8. Using the back and forth movement of the reaction zone 8 between the points of reversal 11 and 12, a number of glass layers 3 (see FIGS. 3 and 4) are thus deposited on the interior of the hollow glass substrate tube 5.

The present invention relates to an internal vapour deposition process of the PCVD type, in which microwaves are coupled into the interior of a hollow glass substrate tube 5 via a resonance space, also called resonator, which partially surrounds the hollow glass substrate tube 5, seen in longitudinal direction, so as to form a reaction zone 8, viz. a plasma. The length 9 of the reaction zone 8 depends in particular on the construction of the resonator and the process settings. The ratio between the length 9 of the reaction zone and the length of the resonator, seen in longitudinal direction, is about 0.5-3.

In a PCVD process, the resonance space is moved back and forth along the length of the hollow glass substrate tube between the points of reversal 11 and 12. Resonators are known in the art, for example from U.S. patent applications published under Nos. US 2007/0289532, US 2003/0159781 and US 2005/0172902, and U.S. Pat. Nos. 4,844,007, 4,714,589 and 4,877,938. The PCVD process is a so-called low-pressure process, by which is meant that the pressure during the internal vapour deposition process is set at a value in the 1-40 mbar range, preferably in the 5-30 mbar range.

Figure 2:
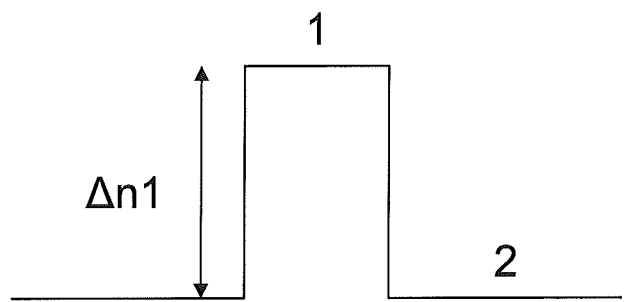
FIG. 2 schematically shows a radial refractive index profile of a step index optical fibre.

In FIG. 2 a radial refractive index profile of a contracted primary preform for an optical fibre is schematically shown. The primary preform comprises a core 1 and a cladding 2. The refractive index difference between the core 1 and the cladding 2 is represented as $\Delta n1$. The core 1 and the cladding 2 both have a constant refractive index value, seen in radial direction. Thus, a primary preform for a step index type of optical fibre is provided. Upon manufacture of a primary preform according to FIG. 2, the cladding 2 comprises a substrate tube 5 and possibly one or more additional preform layers (not shown); said additional preform layers must be considered as preform layers which are made up of several glass layers 3. The glass layers 3 are deposited upon back and forth movement of the reaction zone 8 during the internal vapour deposition process. It is noted that the substrate tube 5 in the primary preform must not be considered to be preform layer.

The layer thickness of a glass layer in a primary preform is reduced many times during the processing of the primary preform into an optical fibre. Layer thicknesses of individual glass layers in a glass layer package for a PCVD type of process range between 0.1 μm and 10 μm per glass layer. A final preform has an external diameter, depending on the type of optical fibre being manufactured, that ranges between 50 mm and 200 mm, so that the layer thickness of a glass layer in the primary preform is reduced by a factor of 400 to 1600, respectively. The consequence of this for primary preforms manufactured by means of a PCVD process is that the layer thickness of a glass layer in the optical fibre will be many times smaller than the wavelength of the light that propagates through the fibre, so that said light is influenced by a relatively large number of glass layers being adjacent to each other and not so much by the individual glass layers.

An optical fibre is mainly used in the wavelength range between about 850 nm and 1700 nm. A typical optical fibre further has a diameter of about 125 μm, more in general the diameter is in the 80 μm-250 μm range.

The present inventors assume that, in addition to the effect of the layer thickness of a glass layer, dopants present in a glass layer diffuse slightly to adjacent glass layers during the processing of the primary preform into an optical fibre. The result of this is that the differences in the refractive index values between adjacent glass layers are slightly reduced.

Figure 3:
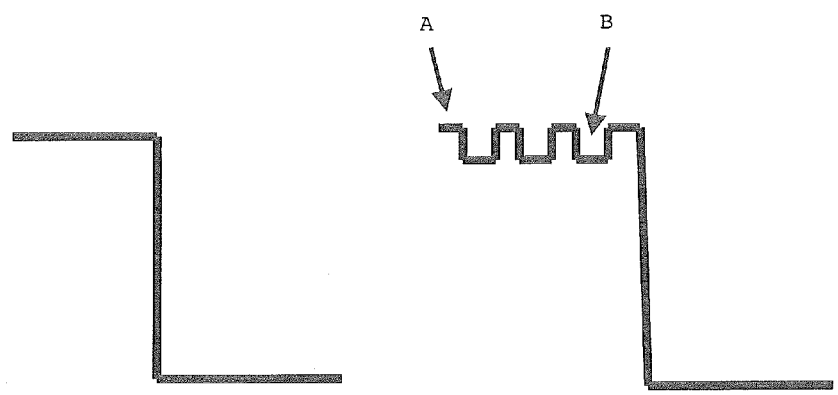
FIG. 3 shows two examples of the refractive index profile of so-called single mode core.

FIG. 3 shows two examples of the refractive index profile of a so-called single mode core. The profile shown on the left-hand side is that of an ideal single mode core, in which the refractive index exhibits a constant value over the entire radius. On the right-hand side the principle according to the present invention is schematically shown. The deposition of the core has been effected by forming several glass layer packages, also called "stacks", with the glass layer packages exhibiting different values for the refractive index. Within such a glass layer package, the refractive index value is constant, however. By using different deposition conditions for different glass layer packages and combining the refractive index values of the glass layer packages thus obtained, an average refractive index value of the core is obtained which is identical to the value as shown on the left-hand side of the figure. Although seven different glass layer packages can be distinguished in FIG. 3, it should be understood that the application is not limited to such a number. Furthermore, on the right-hand side the refractive index values for the "high" and "low" stacks, in fact the combination of stack A and stack B, therefore, are invariably the same. Also in this regard it should be noted that the application is not limited to the combination of stacks A and B, but that many embodiments are possible, for example A B C B C A, etc.

Figure 4:
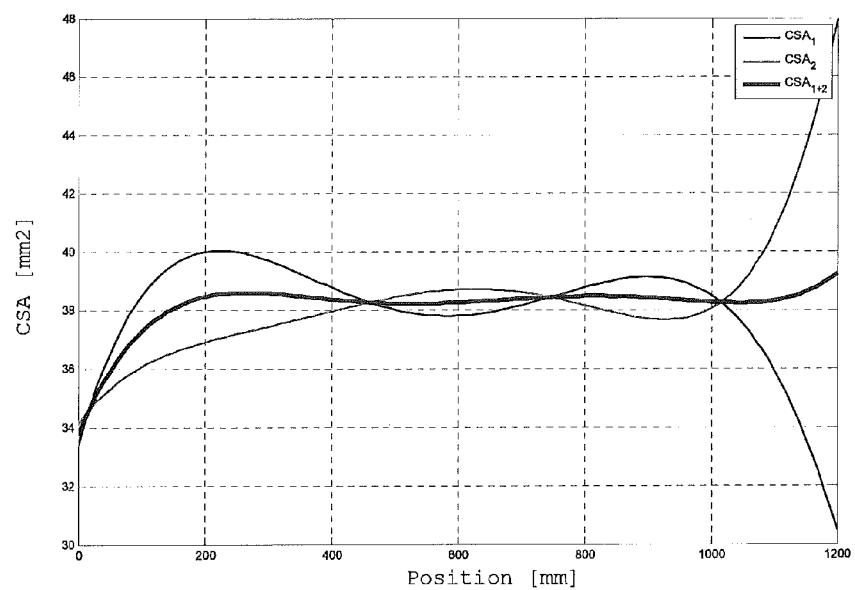
FIG. 4 shows an example of the cross-sectional profile (CSA) as a function of the position of different glass layer packages.

FIG. 4 shows an example of the cross-sectional profile (CSA) as a function of the position of different glass layer packages. The line with the highest CSA value on the left-hand side of the figure can be considered to be the CSA of a first stack. The line with the lowest CSA value on the left-hand side of the figures can be considered to be the CSA of a second stack. The remaining line is half the sum of the two aforesaid lines.

Figure 5:
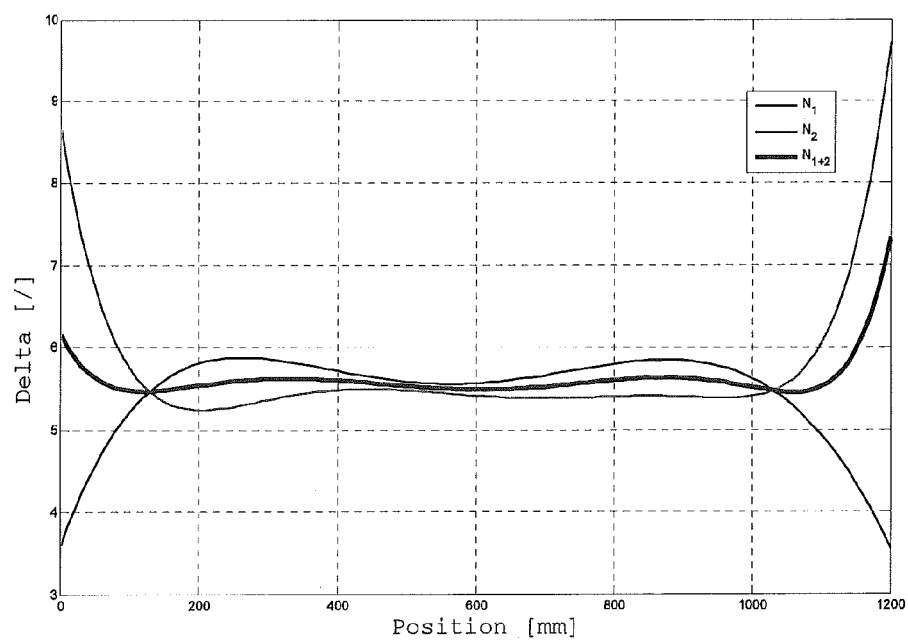
FIG. 5 shows an example of the refractive index value as a function of the position of different glass layer packages.

FIG. 5 shows an example of the refractive index value as a function of the position of different glass layer packages. The line with the highest value for the refractive index on the left-hand side of the figure can be considered to be the refractive index of a first stack. The line with the lowest value for the refractive index on the left-hand side of the figure can be considered to be the refractive index of a second stack. The remaining line is half the sum of the two aforesaid lines.

Both in FIG. 4 and in FIG. 5 it is apparent that the average value exhibit a more uniform behaviour as a function of the position.

Figure 6:
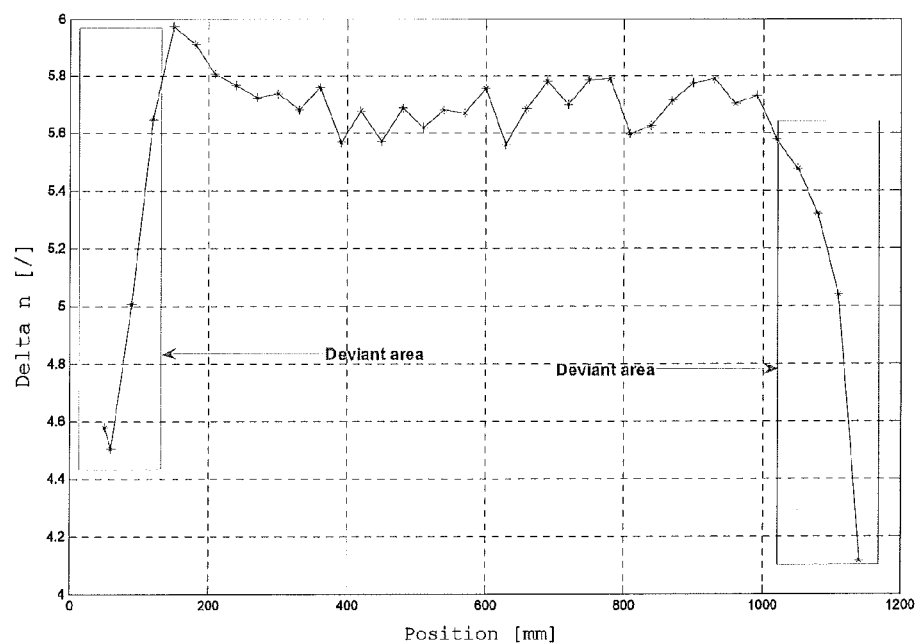
FIG. 6 shows the refractive index value of a single mode core as a function of the position in the preform rod.

FIG. 6 shows the refractive index value of a single mode core as a function of the position in the preform rod, whilst regions deviating from the central region, viz. between 200 and 1000 mm, can be distinguished at both ends of the preform rod. Such deviating values limit the use of the length of the preform rod from which optical fibres can be obtained.

Figure 7:
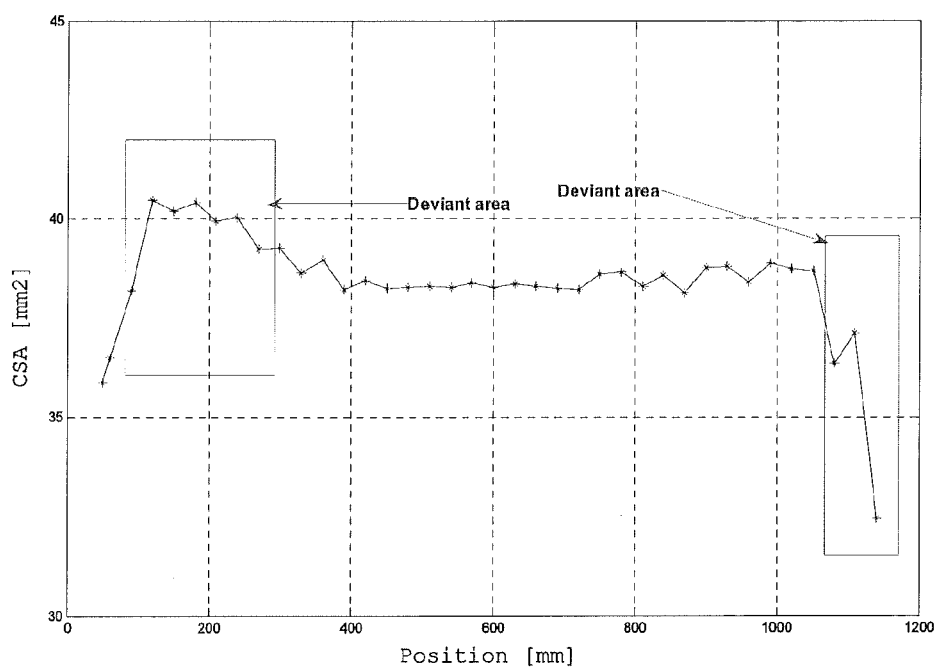
FIG. 7 shows the cross-sectional profile of a single mode core as a function of the position in the preform rod.

FIG. 7 shows the cross-sectional profile of a single mode core as a function of the position in the preform rod. As in FIG. 6, regions deviating from the central region, viz. between 200 and 1000 mm, can be distinguished at both ends in this figure.

Figure 8:
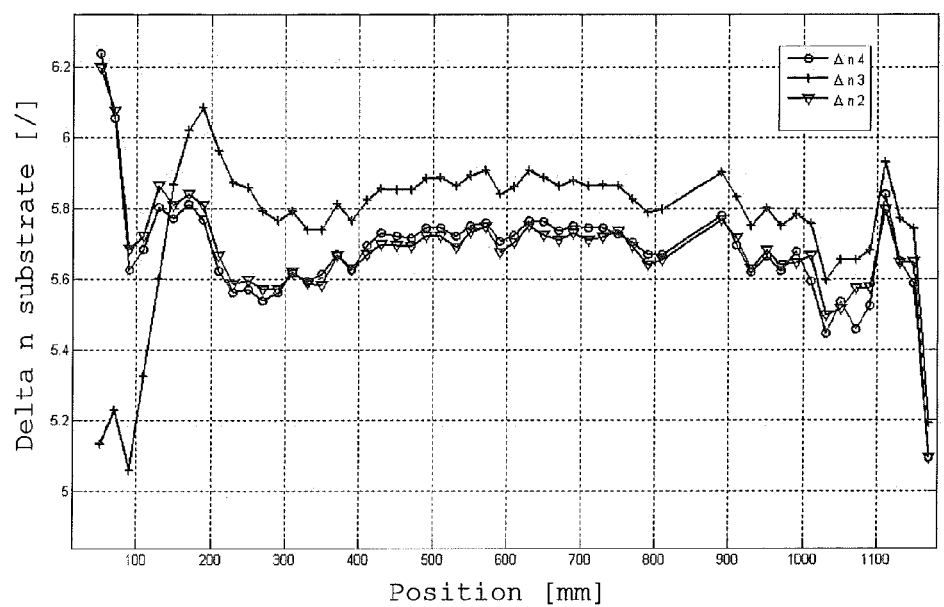
FIG. 8 shows the refractive index profile as a function of the position for a core made up of three glass layer packages.

FIG. 8 shows the refractive index profile as a function of the position for a core according to the present invention which is made up of three glass layer packages. The usable length of the preform rod from which optical fibres can be obtained is greater than that shown in FIG. 6 and FIG. 7.

Figure 9:
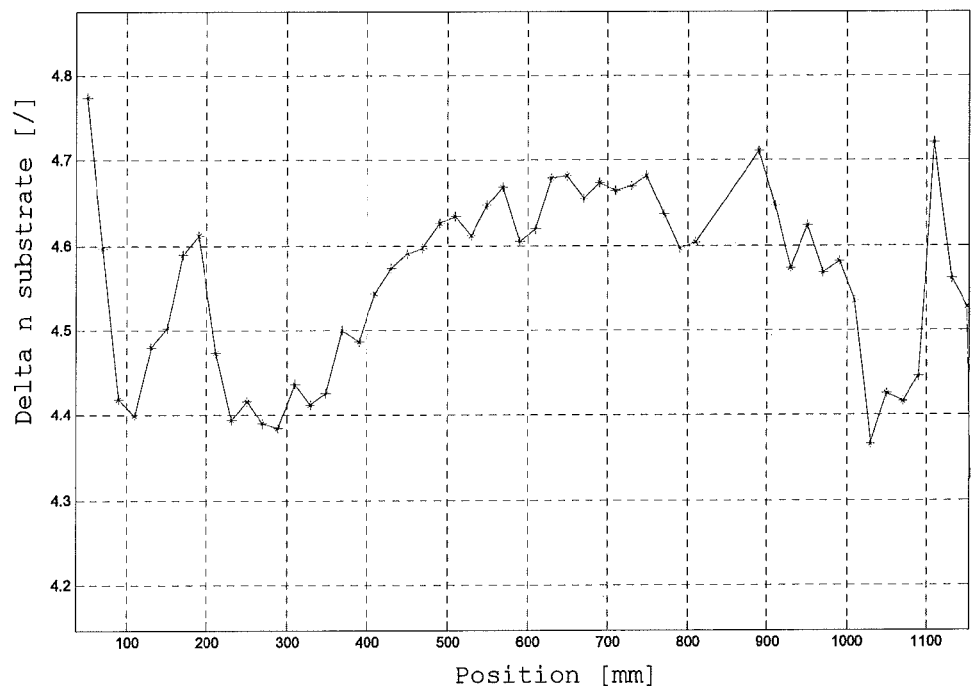
FIG. 9 shows the average refractive index profile as a function of the position for a core made up of three glass layer packages.

FIG. 9 shows the average refractive index profile as a function of the position for a core according to the present invention which is made up of three glass layer packages. Also in this figure an increase of the usable length of the preform rod in comparison with that shown in figure six and FIG. 7 can be distinguished.

Figure 10:
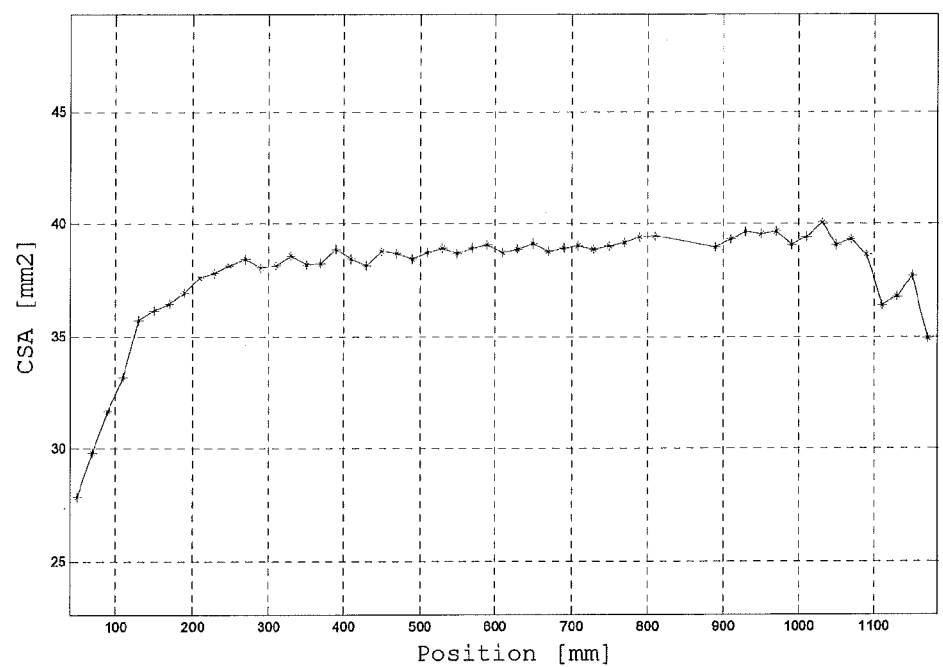
FIG. 10 shows the average cross-sectional profile as a function of the position for a core made up of three glass layer packages.

FIG. 10 shows the average cross-sectional profile as a function of the position for a core according to the present invention made up of three glass layer packages. The increase of the usable length of the preform rod in comparison with that shown in FIG. 6 and FIG. 7 is clearly discernible.

COMPARATIVE EXAMPLE

Figure 11:
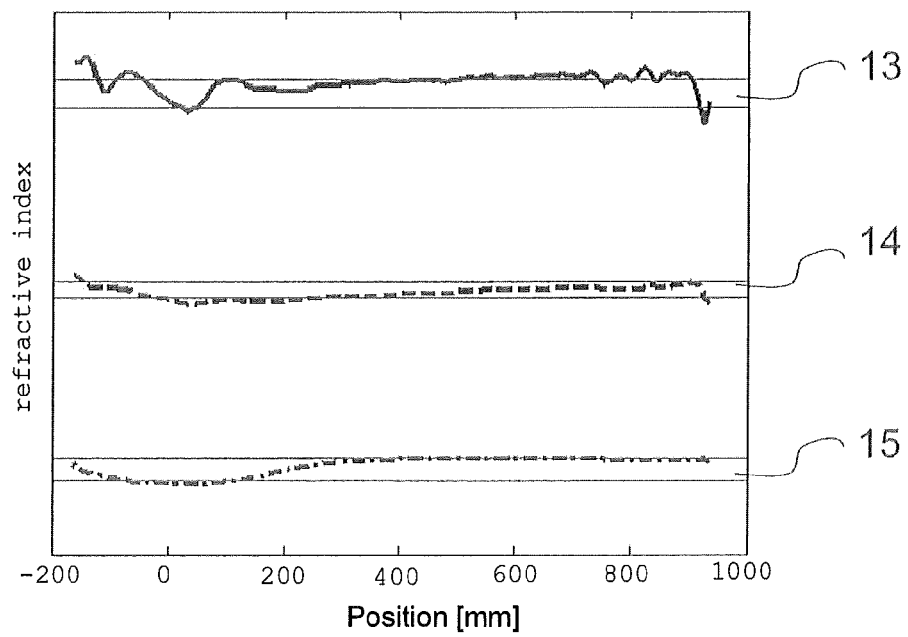
FIG. 11 shows a longitudinal refractive index profile of a primary preform manufactured according to the prior art, using a PCVD process.

FIG. 11 shows a longitudinal refractive, index profile of a primary preform manufactured according to the prior art, using a PCVD process. The position along the length of the primary preform is plotted on the horizontal axis, whilst the refractive index is plotted on the vertical axis. The primary preform according to the comparative example has three preform layers, viz. a preform layer 13 having a high refractive index, which will form the core in the fibre, a preform layer 14 and a preform layer 15. Two horizontal lines are shown around the refractive index value of each preform layer 13, 14 and 15, which lines correspond to the tolerance limits for the refractive index of the preform layer.

The measurements of the refractive index of the preform layers of the primary preform according to the comparative example start at a position of about −175 mm and end at a position of about 950 mm.

As can be observed in said figure, the refractive index of in particular the preform layer 13 is not within the tolerance limits along part of the length. As a result, the usable length of the primary preform according to the comparative example as regards the refractive index is limited to the part of the length between the positions of about −20 mm and 800 mm, or even lower. The result of this is that the usable length of the primary preform according to the comparative example is at most about 820 mm.

Figure 12:
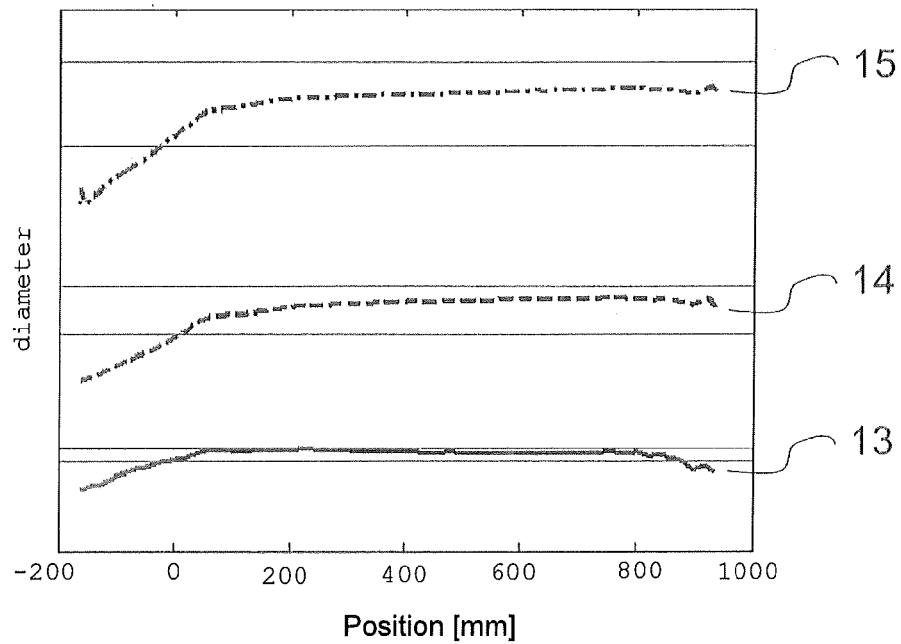
FIG. 12 shows a longitudinal geometry profile of the primary preform according to the comparative example.

FIG. 12 shows a longitudinal geometry profile of the primary preform according to the comparative example. The position along the length of the preform is plotted on the horizontal axis, whilst the diameters of the preform layers are plotted on the vertical axis. The diameters of the preform layers 13, 14 and 15 are shown as a function of the position in the primary preform. Two horizontal lines are shown around the diameter value of each preform layer 13, 14 and 15, which lines correspond to the tolerance limits for the diameter of the preform layer.

As can be observed in said figure, the diameter of in particular the preform layer 14 is not within the tolerance limits along part of the length. As a result, the usable length of the primary preform according to the comparative example as regards the geometric properties is limited to the part of the length between the positions of about 0 mm and 1125 mm.

Since the usable length of the primary preform according to the comparative example was already limited on account of the refractive index between the positions −20 mm and 800 mm, the usable length of the primary preform according to the comparative example will be limited to the part of the length between the positions 0 mm and 800 mm. Put differently, the usable length of the primary preform according to the comparative example is about 800 mm.

What is claimed is:

1. A method for manufacturing a primary preform for an optical fibre, using a plasma chemical internal vapor deposition process, wherein doped or undoped glass-forming precursors are supplied to the interior of a hollow glass substrate tube, a reaction zone in the form of a plasma is moved back and forth along the length of the hollow glass substrate tube between a point of reversal near the supply side and a point of reversal near the discharge side of the hollow substrate tube, wherein the substrate tube is positioned in a furnace and wherein such conditions are created in the reaction zone that one or more glass layer packages made up of at least two separate glass layers are deposited on the interior of the substrate tube, the method comprising the following steps:

i) defining deposition conditions for the deposition of a number of glass layers to be deposited adjacent to each other and forming a glass layer package under the deposition conditions, ii) defining deposition conditions subsequent to step i) for the deposition of a successive number of glass layers to be deposited adjacent to each other and forming a subsequent glass layer package under the deposition conditions subsequent to step i), wherein the deposition conditions defined for steps i) and ii) differ from each other, and iii) optionally repeating steps i) and ii); wherein the deposition conditions defined for step iii) may be identical to the process conditions defined under steps i) and ii), wherein:

the number of glass layers of each of the glass layer packages is set so that the following condition is met:

$$N \leq 0, 1 * \frac{\lambda * Q_{final}}{d * Q_{fibre}}$$

where
N=the number of glass layers in a glass layer package [-]
λ=the minimum wavelength used of the optical fibre [μm]
d=the thickness of a glass layer in a glass layer package of a primary preform [μm]
$Q_{final}$=the diameter of the final preform produced on the basis of the primary preform [mm]
$Q_{fibre}$=the diameter of the optical fibre [mm].

2. The method according to claim 1, wherein the deposition conditions of glass layers adjacent to each other within a particular glass layer package correspond to each other.

3. The method according to claim 1, wherein within a particular glass layer package the refractive index value of one glass layer obtained by deposition corresponds to the refractive index value of another glass layer obtained by deposition.

4. The method according to claim 1, wherein the average refractive index value of glass layer packages made up of a combination of a number of individual glass layer packages arranged adjacent to each other is the combination of the refractive index values of each individual glass layer package, wherein the refractive index values of at least two such individual glass layer packages in the combined glass layer package differ from each other.

5. The method according to claim 1, wherein the cross-sectional area (CSA) of glass layer packages made up of a combination of a number of individual glass layer packages arranged adjacent to each other is the combination of the CSA values of each individual glass layer package, wherein the CSA values of at least two such individual glass layer packages in the combined glass layer package differ from each other.

6. The method according to claim 1, wherein each glass layer of the respective glass layer package has a thickness, seen in radial direction, that ranges from 0.1 to 10 micrometers.

7. The method according to claim 1, wherein the number of glass layers in a particular glass layer package ranges from 2-100.

8. The method according to claim 1, wherein the number of glass layers in a particular glass layer package ranges from 2-50.

9. The method according to claim 1, wherein the number of glass layers in a particular glass layer package ranges from 4-30.

10. The method according to claim 1, wherein the defining of the deposition conditions comprises the setting of one or more process parameters selected from the group consisting of: the flow of the glass-forming precursors to be metered at the supply side, the percentage of dopant(s), the velocity of the reaction zone, the intensity of the plasma of the reaction zone, and the length of the reaction zone.

11. The method according to claim 10, wherein the respective deposition condition is kept constant along the deposition length, that is the length of the substrate tube along which the reaction zone is moved between the two points of reversal, during the deposition of glass layers for forming a particular glass layer package.

12. A method according to claim 11, wherein the deposition condition determined for the deposition of one glass layer package made up of a number of glass layers is constant during the deposition of said one glass layer package, and wherein the deposition condition determined for the deposition of the other glass layer package made up of a number of glass layers is also constant during the deposition of said other glass layer package, but wherein the deposition condition used for said glass layer package is different from the deposition condition used for said other glass layer package.

13. The method according to claim 1, wherein the reaction zone is moved along the length of the substrate tube at an average velocity ranging between 2 m/min-40 m/min.

14. The method according to claim 1, wherein the reaction zone is moved along the length of the substrate tube at an average velocity ranging between 15 m/min-25 m/min.

15. The method according to claim 1, wherein the primary preform comprises at least one preform layer, which preform layer is at least in part built up of glass layer packages, and wherein the preform layer has a substantially constant average refractive index and/or a constant average cross-sectional area, seen in radial direction.

16. A method for manufacturing a final preform for an optical fibre, comprising the following steps:
   i) manufacturing a primary preform by positioning a substrate tube in a furnace and creating a reaction zone such that one or more glass layer packages made up of at least two separate glass layers are deposited on the interior of the substrate tube, by:
      a) defining deposition conditions for the deposition of a number of glass layers to be deposited adjacent to each other and forming a glass layer package under the deposition conditions,
      b) defining deposition conditions subsequent to step a) for the deposition of a successive number of glass layers to be deposited adjacent to each other and forming a subsequent glass layer package under the deposition conditions subsequent to step a), wherein the deposition conditions defined for steps a) and b) differ from each other, and
      c) optionally repeating steps a) and b); wherein the deposition conditions defined for step c) may be identical to the process conditions defined under steps a) and b), wherein:
   the number of glass layers of each of the glass layer packages is set so that the following condition is met:

$$N \leq 0,1 * \frac{\lambda * Q_{final}}{d * Q_{fibre}}$$

where
   N=the number of glass layers in a glass layer package [-]
   $\lambda$=the minimum wavelength used of the optical fibre [μm]
   d=the thickness of a glass layer in a glass layer package of a primary preform [μm]
   $Q_{final}$=the diameter of the final preform produced on the basis of the primary preform [mm]
   $Q_{fibre}$=the diameter of the optical fibre [mm]
   ii) contracting the primary preform obtained in step i) in to a solid primary preform under the influence of a heat source; and
   iii) optionally applying an additional amount of glass to the outer side of the solid primary preform obtained in step ii) so as to form the final preform.

17. The method according to claim 16, further comprising forming an optical fibre by heating the final preform and subsequently drawing the heated final preform to form the optical fibre therefrom.

* * * * *